United States Patent
Monfort et al.

(10) Patent No.: US 10,282,214 B2
(45) Date of Patent: May 7, 2019

(54) SYSTEM AND METHOD FOR POWER MANAGEMENT OF A PLURALITY OF CIRCUIT ISLANDS

(71) Applicant: DOLPHIN INTEGRATION, Meylan (FR)

(72) Inventors: Olivier Monfort, Grenoble (FR); Lionel Jure, Domene (FR); Gauthier Reveret, Meylan (FR); Sébastien Genevey, Gieres (FR)

(73) Assignee: Dolphin Integration, Meylan (FR)

( * ) Notice: Subject to any disclaimer, the term of this patent is extended or adjusted under 35 U.S.C. 154(b) by 202 days.

(21) Appl. No.: 15/333,704

(22) Filed: Oct. 25, 2016

(65) Prior Publication Data

US 2017/0132021 A1    May 11, 2017

(30) Foreign Application Priority Data

Nov. 5, 2015   (FR) ..................... 15 60630

(51) Int. Cl.
*G06F 1/08*      (2006.01)
*G06F 1/10*      (2006.01)
(Continued)

(52) U.S. Cl.
CPC ............ *G06F 9/44505* (2013.01); *G06F 1/08* (2013.01); *G06F 1/10* (2013.01); *G06F 1/324* (2013.01);
(Continued)

(58) Field of Classification Search
CPC ...... G06F 1/3206; G06F 1/324; G06F 1/3296; G06F 1/08; G06F 9/44505; G06F 1/10;
(Continued)

(56) References Cited

U.S. PATENT DOCUMENTS

2004/0268278 A1   12/2004  Hoberman et al.
2006/0123368 A1    6/2006  Pineda De Gyvez et al.
(Continued)

FOREIGN PATENT DOCUMENTS

WO        2004102623 A2    11/2004

OTHER PUBLICATIONS

French National Institute of Industrial Property, Search Report for FR 15/60630, dated Nov. 5, 2015.

*Primary Examiner* — Ji H Bae
(74) *Attorney, Agent, or Firm* — Kevin R. Erdman; Brannon Sowers & Cracraft PC

(57) ABSTRACT

The invention concerns a computing system comprising: a plurality of islands capable of operating in one of a plurality of operating modes, a first island being coupled to a first island control circuit and a second island being coupled to a second island control circuit; a first mediation circuit coupled to the first and second island control circuits and adapted: to receive a first request from the first island control circuit to change a current operating mode of the first island; to receive a second request from the second island control circuit to change a current operating mode of the second island; and to control a first voltage supply circuit and/or a first clock generator to change a voltage and/or clock signal supplied to the first and second islands based on the first and second requests.

12 Claims, 4 Drawing Sheets

(51) Int. Cl.
  *G06F 1/32*     (2006.01)
  *G06F 9/445*    (2018.01)
  *G06F 1/324*    (2019.01)
  *G06F 1/3287*   (2019.01)
  *G06F 1/3296*   (2019.01)
  *G06F 1/3206*   (2019.01)

(52) U.S. Cl.
  CPC .......... *G06F 1/3206* (2013.01); *G06F 1/3287* (2013.01); *G06F 1/3296* (2013.01); *Y02D 10/126* (2018.01); *Y02D 10/172* (2018.01)

(58) Field of Classification Search
  CPC .... G06F 1/3287; Y02D 10/126; Y02D 10/172
  USPC ................................ 713/100, 300, 320, 322
  See application file for complete search history.

(56) References Cited

U.S. PATENT DOCUMENTS

| | | | |
|---|---|---|---|
| 2006/0259800 A1* | 11/2006 | Maejima | G06F 1/3203 |
| | | | 713/300 |
| 2008/0172565 A1 | 7/2008 | Chu et al. | |
| 2010/0058078 A1* | 3/2010 | Branover | G06F 1/3203 |
| | | | 713/300 |
| 2011/0093733 A1* | 4/2011 | Kruglick | G06F 1/3203 |
| | | | 713/340 |
| 2012/0054511 A1 | 3/2012 | Brinks | |
| 2015/0121519 A1* | 4/2015 | Hauke | G06F 1/26 |
| | | | 726/22 |
| 2016/0321070 A1* | 11/2016 | Okazaki | G06F 9/3001 |

\* cited by examiner

SYSTEM AND METHOD FOR POWER MANAGEMENT OF A PLURALITY OF CIRCUIT ISLANDS

CROSS-REFERENCE TO RELATED APPLICATIONS

The present application claims priority under 35 U.S.C. § 119(e) of French Patent application number 15/60630, filed on Nov. 5, 2015, the disclosures of which are incorporated by reference herein.

BACKGROUND OF THE INVENTION

Field of the Invention

The present disclosure relates to the field of systems for managing power and clock distribution in one or more integrated circuits.

For power efficiency, it has been proposed to allow certain circuit regions of an integrated circuit to operate in one of several different operating modes selected based on performance requirements at a given time. For example, a high or low supply voltage, and a high or low frequency clock signal, may be selected depending on whether the circuit region is to have high performance or low power consumption. Such circuit regions are often referred to in the art as islands.

All of the circuits of a given island are for example supplied by common resources. For example, each of the islands receive a common power supply voltage and/or reference voltage and a common clock signal. In some cases, each island has a dedicated voltage regulator for supplying its supply voltage and a dedicated clock generator for generating its clock signal. In this manner, the supply voltage and clock signal of each island can be controlled independently of the other islands.

When a given island is to change its operating mode, for example to enter a low power state, a command is for example transmitted to the island to trigger a sequence of operations for implementing the change in the operating mode. For example, these operations involve hacking up certain data and powering down the various circuits of the island in a given order. The resources supplying the island, such as a voltage supply circuit and clock generator, are also controlled to bring the supply voltage and clock frequency of the island to a desired value.

The power and clock management of the islands is often performed in centralized manner, for example by an activity control unit capable of communicating with each island and its associated voltage regulator and clock generator. However, such a solution has technical drawbacks in terms of complexity and adaptability. Indeed, if a new island is to be added to a given system design, this may require substantial changes to the activity control unit in order to adapt to the new power and clock management requirements of the new island. Furthermore, providing a voltage regular and clock generator for each island leads to a high chip area being occupied by these components, and high power consumption.

There is thus a need in the art for an improved system for providing power and clock management in a computing system.

SUMMARY

It is an aim of embodiments of the present disclosure to at least partially address one or more needs in the prior art.

According to one aspect, there is provided a computing system comprising: a plurality of islands, each island comprising a group of circuits capable of operating in one of a plurality of operating modes, wherein in a first of the operating modes the circuits of the island are adapted to receive a first voltage and/or a first clock signal of a first frequency, and in a second of the operating modes the circuits of the island are adapted to receive a second voltage different from the first voltage and/or a second clock signal of a second frequency different from the first frequency, a first of the islands being coupled to a first island control circuit and a second of the islands being coupled to a second island control circuit, the first and second islands receiving a same voltage and/or a same clock signal; a first mediation circuit coupled to the first and second island control circuits and adapted;—to receive a first request from the first island control circuit to change a current operating mode of the first island;—to receive a second request from the second island control circuit to change a current operating mode of the second island; and–to control a first voltage supply circuit and/or a first clock generator to change the voltage and/or the clock signal supplied to the first and second islands based on the first and second requests.

According to one embodiment, the first and second island control circuits are coupled via an island control bus to one or more operating mode control circuits, and the first and second island control circuits are adapted to generate the first and second requests respectively based on a change of mode request transmitted by the one or more operating mode control circuits.

According to one embodiment, the computing system comprises a further bus coupled to each of the first and second islands and providing a data link between the islands, the island control bus being dedicated to operating mode control communications.

According to one embodiment, the computing system further comprises a second mediation circuit coupled to the first mediation circuit and to a second resource adapted to supply: a first voltage level to the first voltage supply circuit or the first clock generator; or a first clock signal to the first clock generator, wherein the second mediation circuit is adapted to receive a request from the first mediation circuit to modify the operating mode of the second resource.

According to one embodiment, the first mediation circuit is adapted to control the first voltage supply circuit and/or the first clock generator to change a voltage level and/or clock signal supplied to the first and second islands to values compatible with the first and second requests.

According to one embodiment, the first island is formed on a first integrated circuit, and at feast one of: the second island; the voltage supply circuit; and the clock generator are formed on a second integrated circuit.

According to one embodiment, the computing system further comprises a domain link controller (DLC) circuit coupled: to the first and second island control circuits via an island control bus; and to one or more operating mode control circuits for controlling the operating modes of the first and second islands, via the first and second island control circuits.

According to one embodiment, the one or more operating mode control circuits comprise: a first operating mode control circuit executing a mode switching program; and a second operating mode control, circuit coupled to the DLC circuit and adapted to control the operating modes of the first and second islands while the first operating mode control circuit is unavailable.

According to one embodiment, the first island control circuit is coupled to the first island via a plurality of control lines providing one or more control signals for controlling a change in operating mode of the first island; and the second island control circuit is coupled to the second island via a plurality of control lines providing one or more control signals for controlling a change in operating mode of the second island.

According to a further aspect, there is provided a method comprising: receiving, by a first mediation circuit coupled to first and second island control circuits, a first request from the first island control circuit to change a current operating mode of a first island; receiving, by the first mediation circuit coupled to the first and second island control circuits, a second request from the second island control circuit to change a current operating mode of a second island, the first island control circuit being coupled to a first island, the second island control circuit being coupled to a second island, the first and second islands receiving a same voltage and/or a same clock signal and each of the first and second islands comprising a group of circuits capable of operating in one of a plurality of operating modes, wherein in a first of the operating modes circuits of the island receive a first voltage and/or a first clock signal of a first frequency, and in a second of the operating modes circuits of the island receive a second voltage different from the first voltage and/or a second clock signal of a second frequency different from the first frequency; and controlling, by the first mediation circuit, a first voltage supply circuit and/or a first clock generator to supply the first or second voltage and/or the first or second clock signal to the first and second islands based on the first and second requests.

BRIEF DESCRIPTION OF THE DRAWINGS

The foregoing and other features and advantages will become apparent from the following detailed description of embodiments, gives by way of illustration and not limitation with reference to the accompanying drawings, in which.

Figure 1:
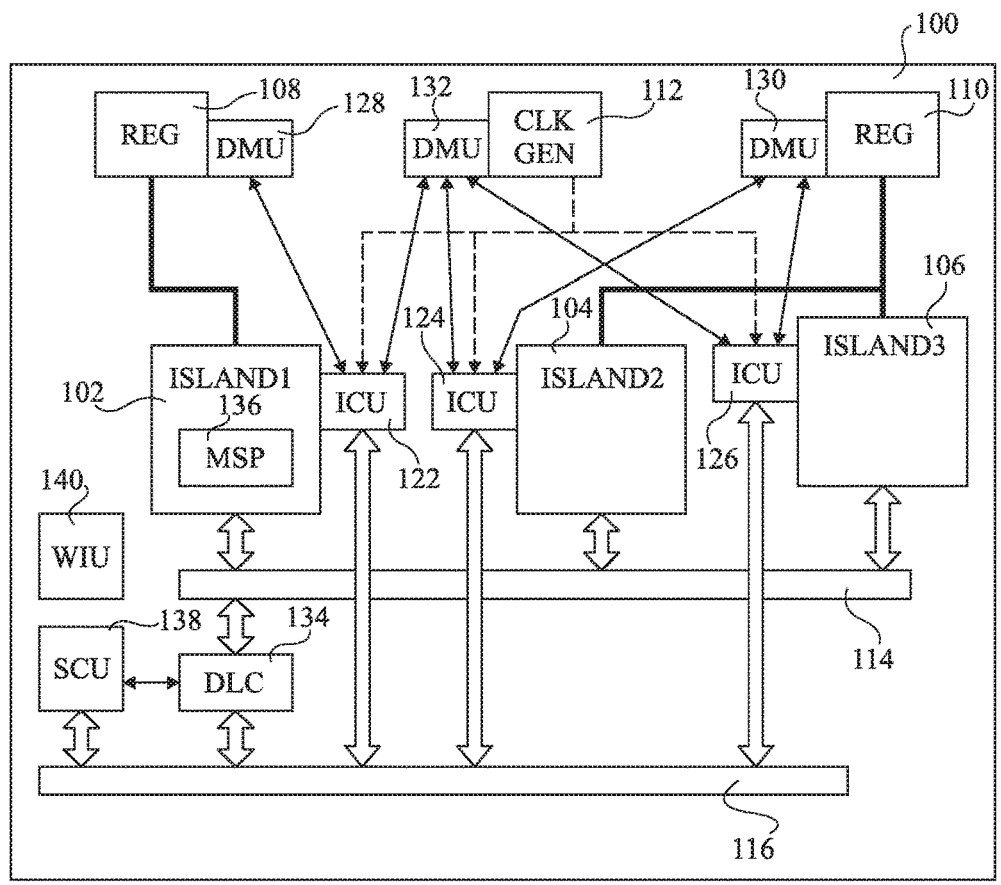
FIG. 1 schematically illustrates a computing system according to an example embodiment.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates an embodiment of the invention, in one form, and such exemplifications are not to be construed as limiting the scope of the invention in any manner.

DETAILED DESCRIPTION

The embodiments disclosed below is/are not intended to be exhaustive or limit the invention to the precise form disclosed in the following detailed description. Rather, the embodiment is chosen and described so that others skilled in the art may utilize its teachings.

FIG. 1 schematically illustrates a computing system 100 according to an example embodiment. The computing system 100 may correspond to a system on chip (SoC), or to a plurality of integrated circuit chips. The system 100 comprises a plurality of islands. In the example of FIG. 1 there are three islands (ISLAND1, ISLAND2, ISLAND3) labelled 102, 104 and 106, but in alternative embodiments there could be any number of islands.

Each of the islands 102, 104, 106 corresponds to group of circuits that share a common supply and/or reference voltage and/or a common clock signal. Whereas the supply voltage is a voltage used to power the island, a voltage reference is for example a voltage level used as reference by one or more analogue circuits of the island. Although the voltage and clock supplied to the islands are common, each island for example comprises input switches permitting one or more of the signals to be independently switched off within each island.

Each of the islands 102, 104, 106 is for example capable of operating in one of a plurality of operating modes. Each operating mode for example corresponds to a particular combination of parameters relating to the supply and/or reference voltage, clock frequency and power state of the circuit. For example, one operating mode could correspond to a high-performance mode in which the supply voltage and clock frequency are at relatively high levels. Another operating mode could correspond to a low power standby mode, in which the supply voltage is at a relatively low level that is just high enough to ensure data retention, the clock signal is maintained but gated by the island, such that the island can be restarted quickly.

The computing system 100 for example comprises one or more voltage regulators (REG) for supplying the supply voltages to the islands. In the example of FIG. 1, the computing system 100 comprises two voltage regulators 108 and 110. As represented by thick solid lines, the voltage regulator 108 for example provides a supply voltage to the island 102, and the voltage regulator 110 for example provides a supply voltage to the islands 104 and 106. Each of the voltage regulators 108, 110 for example comprises one or more circuits including current and voltage sources for generating a supply voltage, and/or a power selection switch for selecting between a plurality of voltage regulators.

The computing system 100 also comprises one or more clock generators (CLK GEN). In the example of FIG. 1, the computing system 100 comprises a single clock generator 112. As represented by dashed lines in FIG. 1, the clock generator 112 for example provides a common clock signal to each of the islands 102, 104 and 106. For example, the clock generator 112 comprises one or more of: a crystal oscillator; a frequency divider; a frequency locked-loop; a phase locked-loop; a delay locked-loop; an embedded oscillator such as an RC (resistor-capacitor) oscillator; a sing oscillator; and/or other-circuits capable of generating a clock signal.

While not illustrated in FIG. 1, the computing system 100 may comprise one or more further resources in addition to or instead of the voltage regulators 108, 110 and clock generator 112. For example, the computing system 100 may comprise other types of voltage supply circuit, such as a reference voltage supply circuit.

The computing system 100 for example comprises a data communications bus 114 providing a data link between the various circuits of the islands 102, 104 and 106.

In addition to the data bus 114, an island control bus 116 is also for example provided for the purposes of power and clock management. The bus 116 is for example coupled to an island control unit (ICU) associated with each island, the ICU of the islands 102, 104 and 106 being respectively labelled 122, 124 and 126 in FIG. 1. Each ICU 122, 124, 126 is for example coupled to the corresponding island 102, 104, 106, and for example supplies control signals for controlling the power and clock state of the island.

A dependency mediator unit (DMU) is tor example associated with each resource, for example with each voltage regulator and each clock generator of the computing system 100 of FIG. 1. For example, the voltage regulators 108 and 110 are associated with DMUs 128 and 130 respectively, and the clock generator is associated with a DMU 132. Each of the ICUs 122, 124 and 126 is for example coupled to the DMU of the voltage regulator providing the supply voltage to its connected island, and to the DMU of the clock generator providing the clock signal to its connected island. Thus, in the example of FIG. 1, the ICU 122 of the island 102 is coupled to the DMUs 128 and 132 the ICUs 124 and 126 of the islands 104 and 106 are each coupled to both of the DMUs 130 and 132. In the embodiment of FIG. 1, the interface between the DMUs 128, 130, 132 and the ICUs 122, 124, 126 is provided by a plurality of dedicated communication wires. However, in alternative embodiments, these communications could be made using the bus 116.

A domain link controller (DLC) 134 is for example coupled to the bus 116, and for example arbitrates between power management commands generated by a mode switching program (MSP) 136 and by a shift control unit (SCU) 138.

The MSP 136 is for example implemented in the island 102, although in alternative embodiments it could be implemented elsewhere in the computing system 100. The MSP 138 for example controls the operating modes of the islands via the bus 116. For example, the MSP 138 stores a list indicating a current power state and operating mode of each of the islands. The MSP 136 is thus capable of coordinating transitions between operating modes of the islands 102, 104 and 106. The MSP 136 is for example a program for example loaded into an instruction memory and executed by a microprocessor of the island 102 (not illustrated in FIG. 1). When the instructions of the MSP are executed by the microprocessor, they allow the functions of the MSP 136, described in more detail below, to be implemented.

The SCU 138 is for example a circuit adapted to provide power management while the MSP 136 is unable to perform this role, for example because it has been powered down. For example, the MSP controls a start-up sequence, wake-up sequence and entry into a sleep mode of the computing system 100 when the MSP is in a sleep mode or otherwise unavailable. It is also for example responsible for the start-up sequence of the MSP 136, by for example controlling the order that the various components of the MSP are turned on, and thus preventing the system from entering an undesired state from which it cannot exit.

The DLC 134 is for example adapted to receive commands from both the MSP 136 and the SCU 138. The DLC 134 for example communicates with the MSP 136 via the data bus 114, and it may communicate with the SCU 138 via a dedicated link represented in FIG. 1 by an arrow between the SCU 138 and the DLC 134, or via the bus 116. The DLC 134 for example provides an interface between the MSP 136/SCU 138 and the bus 116 by translating commands received from the MSP 136 or SCU 138 into commands that can be transmitted over the bus 116 to the ICUs using the particular bus protocol applied on the bus 116. The DLC 134 also for example translates return signals received over the bus 116 from the ICUs so that the information is accessible by the MSP 136 or SCU 138. Furthermore, the DLC 134 is for example adapted to allow the MSP 136 to control the power management network whenever it is capable of doing so, and otherwise to allow the SCU 138 to control the power management network.

A wake-up interrupt unit (WIU) 140 is for example coupled to the SCU 138, although in alternative embodiments it could be coupled to one of the ICUs 122, 124, 126. The WIU 140 is for example a circuit adapted to manage interrupts that cause one or more of the islands 102, 104, 106 to be woken. The WIU 140 for example does this by identifying the origin of each interrupt, saving each interrupt until the concerned island or islands is/are capable of handling it, and transmitting it to the concerned island or islands as soon as they have been woken and are able to process the interrupt.

In operation, the MSP 136 is for example adapted to modify the operating mode of one or more of the islands 102, 104, 106 by transmitting over the bus 116 an appropriate command to the corresponding ICU 122, 124 and/or 126, for example via the DLC 134. The ICUs receiving this command for example process it locally and determine the appropriate sequence of changes to the power state, supply voltage and/or clock signal of the connected island in order to achieve the desired operating mode change. Each ICU then transmits a request to the DMU associated with its voltage regulator and/or to the DMU associated with its clock generator, requesting the corresponding changes. If the DMU is able to make the requested changes, it for example controls the voltage regulator/clock generator accordingly, and confirms to the ICU that the request has been fulfilled. The ICU then for example informs the MSP 136 that the change has been made successfully, such that the MSP 136 can update its record of the operating mode of the corresponding ICU. In the case that the voltage regulator and/or clock generator supplies more than a single island, the DMU for example arbitrates between the requests from each of the islands, and selects or maintains the supply voltage and/or clock signal that satisfies a minimum requirement of each of the islands.

In one embodiment, each of the islands 102, 104, 106 supports at least some of the following 16 operating modes, where V is the voltage and F is the frequency:

| Mode Number | Mode Parameters | Description |
| --- | --- | --- |
| 0 | Regular V and F, ON | Normal operating mode |
| 1 | Regular V, | Island functioning with medium |

| Mode Number | Mode Parameters | Description |
|---|---|---|
| | Medium F, ON | frequency clock at regular voltage |
| 2 | Regular V, Low F ON | Island functioning with low frequency clock at regular voltage |
| 3 | Medium V and F, ON | Island functioning with medium voltage and medium frequency |
| 4 | Medium V, Low F, ON | Island functioning with medium voltage and low frequency |
| 5 | Low V and F, ON | Island functioning with low voltage and low frequency |
| 6 | Regular V and F, CLK OFF | Island in standby mode |
| 7 | Medium V and F, CLK OFF | Island in standby mode with medium voltage and clock frequency |
| 8 | Low V and F, CLK OFF | Island in standby mode with low voltage and clock frequency |
| 9 | Regular V and F RETQ | Island in retention mode with quick restart, the regular voltage and frequency being maintained by the voltage regulator and clock generator |
| 10 | Medium V and F RETQ | Island in retention mode with quick restart based on medium voltage and clock frequency |
| 11 | Low V and F, RETQ | Island in retention mode with quick restart based on low voltage and clock frequency |
| 12 | Ultra-low V, CLK OFF, RETS | Island in retention mode with slow start and ultra-low voltage, the clock signal being turned off |
| 13 | Regular V and F, EXTQ | Island non-operational, with no data retention, and quick restart based on regular voltage and clock frequency |
| 14 | Medium V and F, EXTQ | Island non-operational, with no data retention, and quick restart based on medium voltage and clock frequency |
| 15 | V OFF, F OFF | Island in shut-down mode with no voltage or clock |

Of course, the above table provides just one example of a list of possible operating modes, which has the advantage that any of the operating modes can be selected using only a 4-bit command. There are however many alternative sets of operating modes that could be used, having the same or a different number of available modes.

Figure 2:
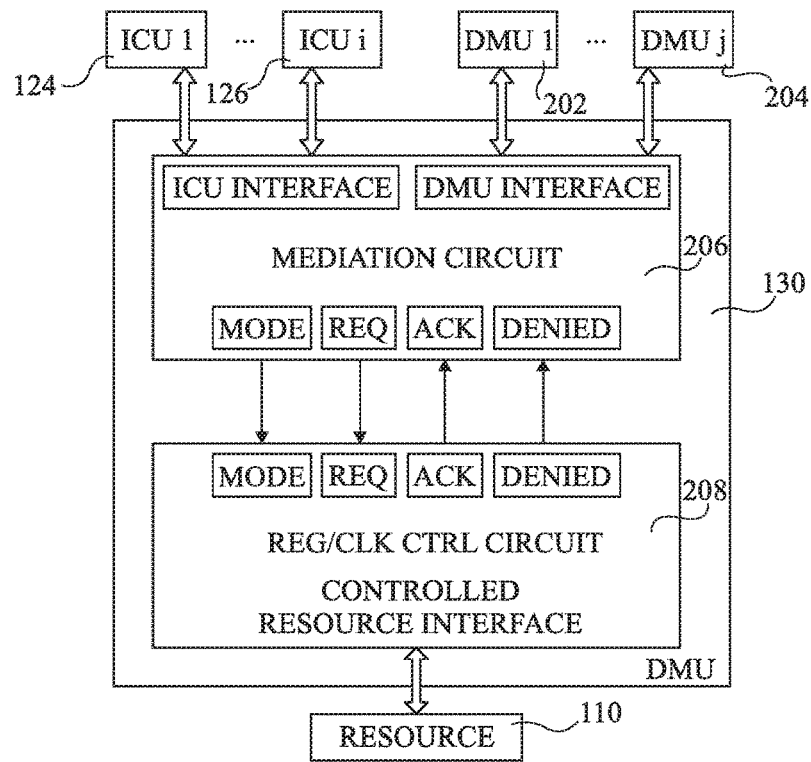
FIG. 2 schematically illustrates a dependency mediator unit of FIG. 1 in more detail according to an example embodiment.

FIG. 2 schematically illustrates the DMU 130 of FIG. 1 in more detail according to an example embodiment. The other DMUs 128 and 132 of FIG. 1 are for example implemented in a similar manner.

The DMU 130 for example comprises a mediation circuit (MEDIATION CIRCUIT) 206, which for example comprises an ICU interface (ICU INTERFACE) for communicating with one or more ICUs and a DMU interface (DMU INTERFACE) for communicating with one or more further DMUs. In the example of FIGS. 1 and 2, the DMU 130 communicates with the ICUs 124 and 126, although it could additionally communicate with further ICUs. Furthermore, in the example of FIG. 2, the DMU 130 communicates with DMUs 202 and 204.

The DMU 130 also for example comprises a control circuit (REG/CLK CTRL CIRCUIT) 208 for communicating with the mediation circuit 206 and with one or more resources (RESOURCE) such as the voltage regulator 110. For example, the mediation circuit 206 provides, to the control circuit 208, mode (MODE) and request (REQ) signals, indicating when a change of mode is desired, and receives from the control circuit 208 acknowledgement (ACK) and request denied (DENIED) signals. For example, the acknowledgement signal is asserted by the control circuit 208 when the requested mode change can be granted, whereas the request denied signal is for example asserted when a resource has not replied within a certain time, and thus the request is considered by the mediation circuit 206 to be denied.

The control circuit 208 for example comprises a resource interface (CONTROLLED RESOURCE INTERFACE) permitting it to communicate with a resource such as the voltage regulator 110.

Figure 3:
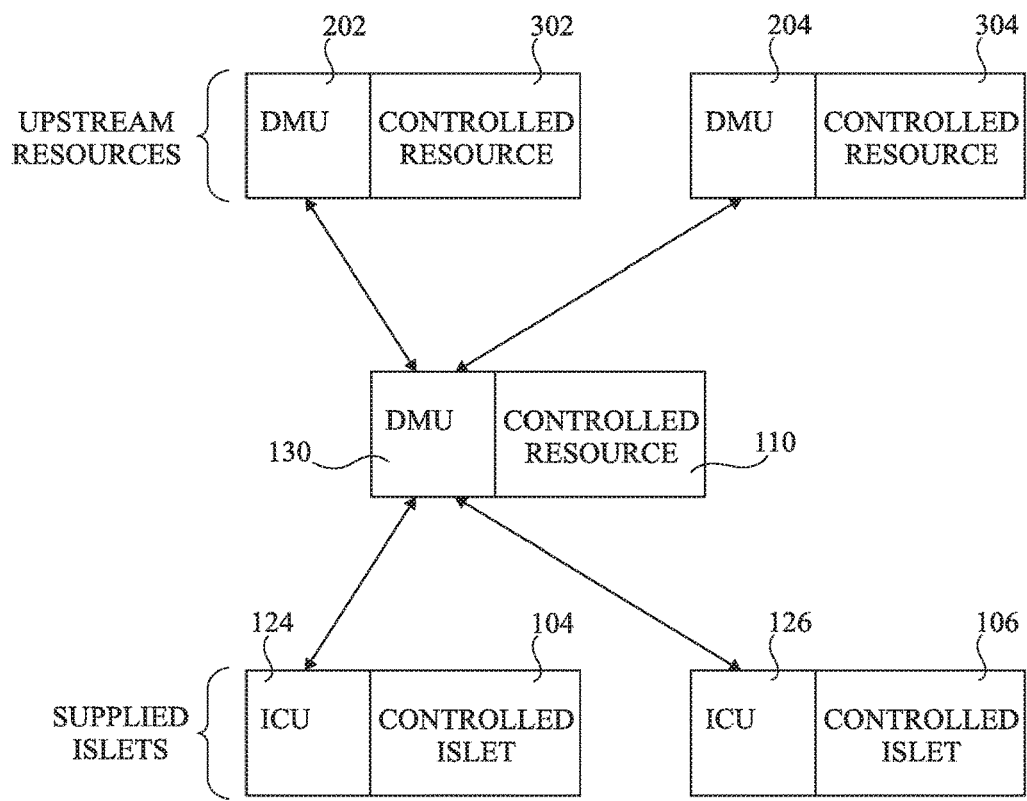
FIG. 3 schematically illustrates a voltage and clock management network according to an example embodiment of the present disclosure.

FIG. 3 schematically illustrates the voltage and clock management network associated with the DMU 130 in more detail according to an example embodiment. As described previously, the DMU 130 communicates with the ICUs 124, 126 associated with its supplied islands, and with DMUs 202 and 204 associated with upstream resources. For example, the DMU 202 is associated with a controlled resource (CONTROLLED RESOURCE) 302, and the DMU 204 is associated with a controlled resource (CONTROLLED RESOURCE) 304. For example, the resources 302 and 304 each correspond to a different voltage regulator, and the resource 110 corresponds to a power selection switch that selects one of the voltage regulators 302, 304 to provide the supply voltage to the resource 110. When the DMU 130 is to implement a change of operating mode of an island, it is for example capable of requesting, via the DMU 202 or 204, that the upstream resource is controlled accordingly, for example to turn off or on the supply voltage.

Figure 4:
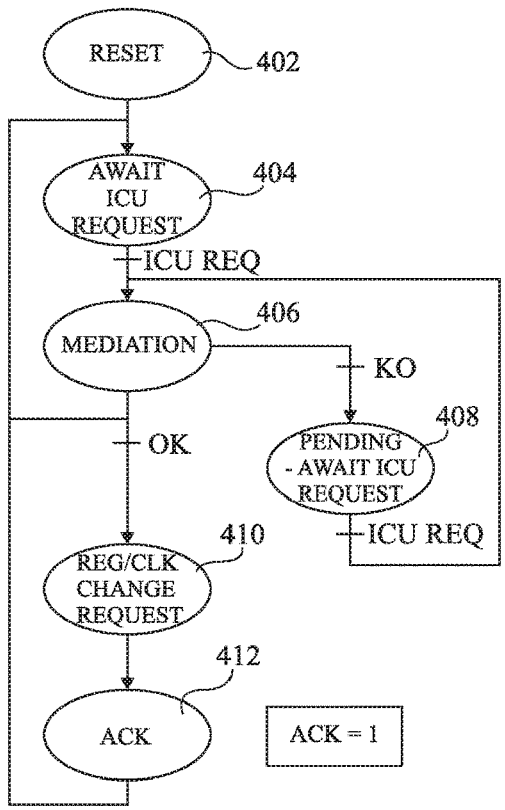
FIG. 4 is a state diagram representing the states of the dependency mediator unit of FIG. 1 according to an example embodiment.

FIG. 4 is a state diagram representing an example of the states and state transitions in each of the DMUs 128, 130, 132.

A reset state (RESET) 402 is for example entered upon power-up of the DMU, or following any reset operation.

The DMU then enters a state 404, in which it is awaiting a request from an ICU.

When an ICU request arrives (ICU REQ), the DMU for example transitions to a mediation state (MEDIATION) 406. From the mediation state 406, if the requested mode is the same as or is compatible with the current mode of the resource, the acknowledgement signal is returned to the ICU by setting it to a logic 1, and the DMU then returns to the state 404. However, if in state 406 the DMU is unable to meet the requested change of mode request (KO), it for example enters a state 408, in which, a denied signal is returned to the ICU, the request is indicated as pending, and it awaits a further ICU request (PENDING . . . AWAIT ICU REQUEST). If such a further ICU request arrives, the DMU returns to the mediation state 406 to determine whether the request can now be met. If, in the mediation state 406, the DMU determines that it is able to meet one or more requested/pending mode changes (OK), it enters a change request state (REG/CLK CHANGE REQUEST) 410 in which the corresponding resource is commanded to change mode. The DMU then enters an acknowledgement state (ACK)412, in which the acknowledgement signal returned to the ICU is for example set to a logic 1, and the DMU then-returns to the state 404.

Figure 5:
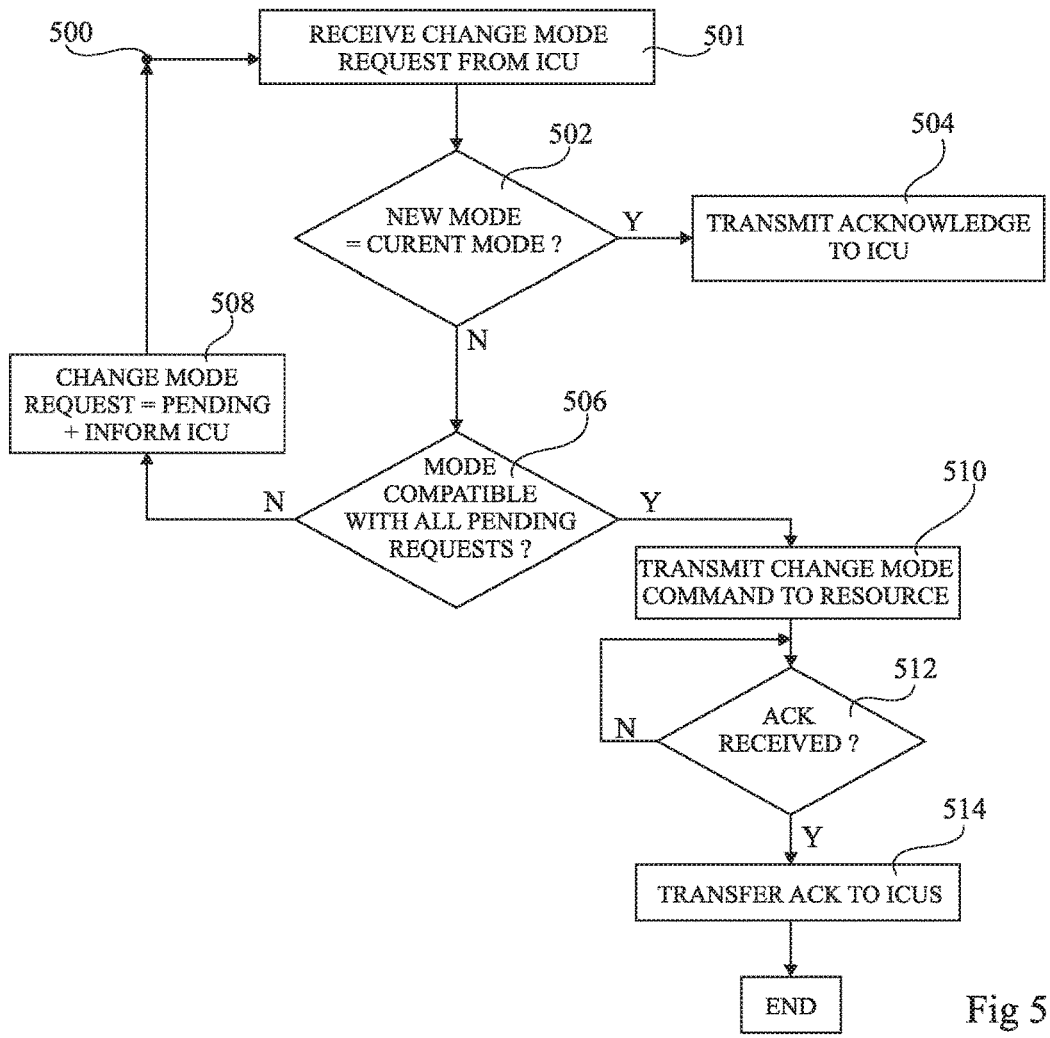
FIG. 5 is a flow diagram illustrating operations in a method of mediating between power supply and/or clock frequency change requests according to an example embodiment.

FIG. 5 is a flow diagram illustrating operations in a method of mediating between change of mode requests according to an example embodiment. These operations are for example performed by the mediation circuit 206 and the control circuit 208 of the DMU described above with reference to FIG. 2. Of course, the flow of FIG. 5 is just one example of how mediation can be implemented by the DMUs, and variations could be made to this method. It is assumed in the example of FIG. 5 that the resource controlled by the DMU supplies at least two islands, and thus the DMU is coupled to at least two corresponding ICUs.

From a start point 500, in as operation 501, a mode change request is received by the DMU from an ICU.

In a subsequent operation 502, it is for example determined whether the new mode that is requested is equal to the current mode. If so, an acknowledgement signal can be directly returned to the ICU in an operation 504. This for example occurs if another ICU has already requested the same change of state, and thus the mode has been changed. If, however, the new mode is not the same as the current mode, the next operation is 506.

In operation 506, it is determined whether the new mode that is requested is compatible with all other pending requests, in other words with the modes required by all other islands connected to the resource.

For example, assuming the resource is a voltage regulator, and its current mode based on pending requests is a low supply voltage, the new requested mode may be to increase the voltage to a medium supply voltage. Such a request is compatible with the pending requests, because the islands operating with a low supply voltage can also operate with a medium supply voltage. If however the new request is to turn off the voltage regulator, such a request is not compatible with the pending requests, which require at least the low supply voltage.

If the new mode is not compatible with all pending requests, the next operation is for example an operation 508, in which the new mode change request is marked as pending, and the ICU is informed accordingly that the mode change request has been denied.

Alternatively, if in operation 506 the new mode is compatible with all pending requests, the next operation is 510.

In operation 510, a mode change command is for example generated and transmitted to the resource under control of the DMU.

In a subsequent operation 512, it is determined whether an acknowledgement has been received from the resource, indicating that the requested change has been completed. Once the acknowledgement has been received, an operation 514 is for example performed, in which the acknowledgement is transferred to the ICU from which the mode change request originated. The method then for example ends.

Figure 6:
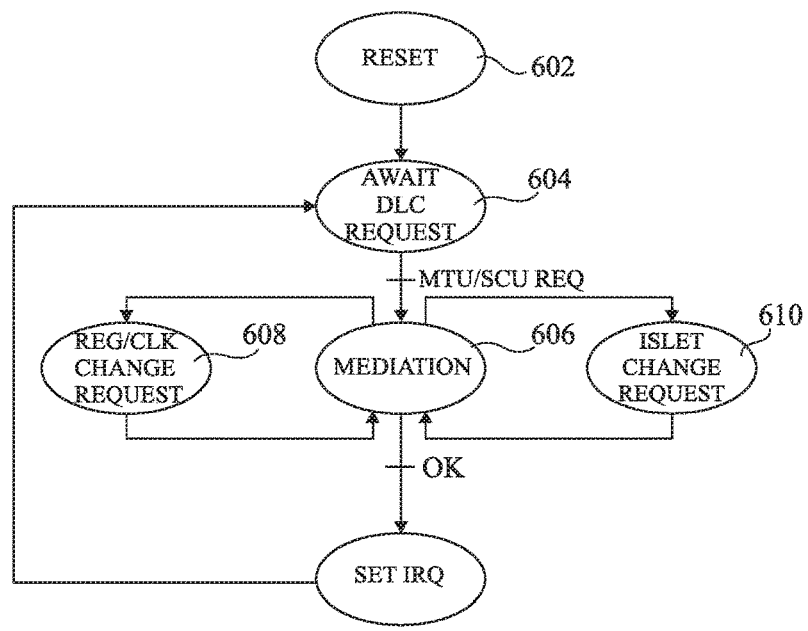
FIG. 6 is a state diagram representing states of an island control unit of FIG. 1 according to an example embodiment.

FIG. 6 is a state diagram illustrating an example of states and state transitions in each of the ICUs 122, 124, 126.

A reset state (RESET) 602 is for example entered upon power-up of the ICU, or following any reset operation.

An await DLC request state (AWAIT DLC REQUEST) 604 is then for example entered by the ICU, during which the ICU awaits a mode change request from the DLC 134, the request for example originating from the MSP 136 or from the SCU 138.

When an MSP or SCU request (MSP/SCU REQ) arrives, a mediation state (MEDIATION) 606 is for example entered. From this state, a further two states 608, 610 are entered concurrently or consecutively. The order in which the states 608, 610 are entered depends for example on the particular change of mode to be implemented.

State 608 is a regulator/clock generator change request state (REG/CLK CHANGE REQUEST) in which a request is sent to the DMU of the clock generator and/or voltage regulator of the island to change mode. The ICU awaits an acknowledgement from the relevant DMU or DMUs that the requested change has been completed. State 610 is an island change request (ISLAND CHANGE REQUEST) state, in which the island is requested to make the requested mode change. Again, the ICU for example awaits an acknowledgement from the island that the request change has been completed.

If the operations performed during each of the states 608, 610 are successful, the ICU for example returns to the mediation state 606, and it is determined that the change has been successfully completed. The ICU thus for example informs the MSP 136 or SCU 138 that the change has been completed successfully, depending on which circuit initiated the change of mode request. In some embodiments, this is achieved by setting an interrupt in the DLC 134 that can be detected by the MSP 136 or SCU 138. Thus the ICU for example moves to a set interrupt (SET IRQ) state, in which an interrupt is set, for example by asserting a bit, associated with the ICU, in a register stored by the DLC 134. This register is also accessible by the MSP 136 and SCU 138, and indicates that the mode change has terminated and that details of the change of state can be obtained from the ICU. The ICU then for example returns to state 604.

Figure 7:
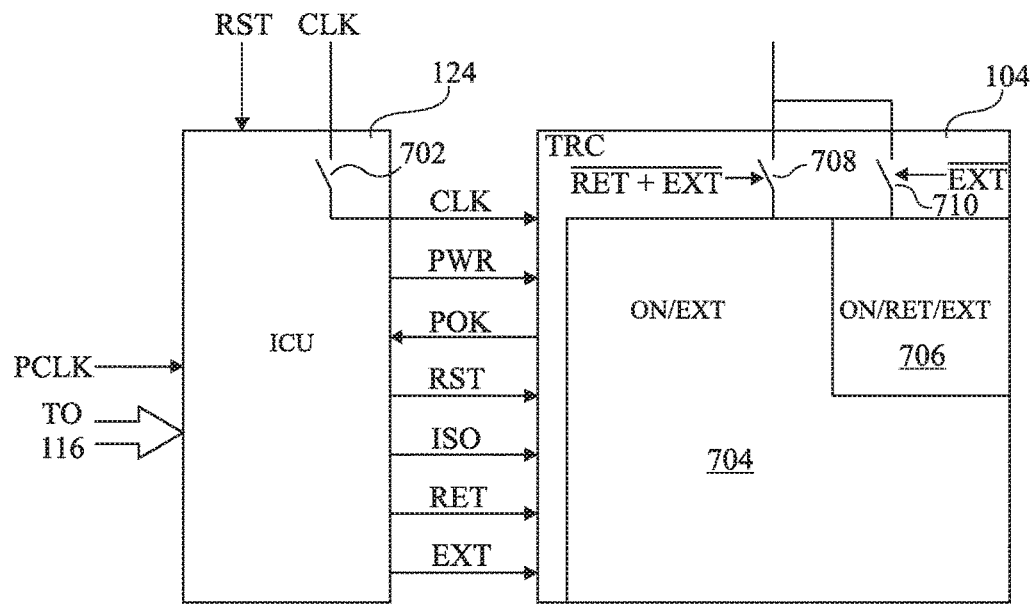
FIG. 7 schematically illustrates an interface between an island control unit and as island of FIG. 1 according to an example embodiment.

FIG. 7 schematically illustrates the interface between the ICU 124 and the Island 104 according to an example embodiment. The interfaces between the other ICUs and islands of the computing system 100 are for example implemented in a similar fashion.

As illustrated, the ICU 124 for example receives the clock signal CLK from the clock generator 112, and provides this clock to island 104. The ICU 124 for example comprises a switch 702 allowing this clock to be gated. The ICU 124 also for example receives a clock signal PCLK of the bus 116, allowing data to be successfully, received over the bus 116, and a reset signal RST for resetting the ICU.

The island 104 for example comprises an island controller TRC (Transition Ramp Cell), a circuit portion 704 that may be either powered on or off (ON/EXT), and a circuit portion 706 that may be powered on or off, or may enter a retention state (ON/RET/EXT). For example, the circuit portion 704 is powered by the supply voltage line of the island via a switch 708 controlled by the inverse of a signal "RET+ EXT", corresponding to the inverse of the logic OR of these signals. Thus the switch 708 supplies the circuit portion 704 unless the circuit portion is to be powered-OFF (signal EXT is asserted) or to enter a low power retention mode (signal RET is asserted). The circuit portion 706 is for example powered by the supply voltage line of the island via a switch 710, controlled by the inverse of the signal EXT. Thus the switch 71 supplies the circuit portion 706 unless the circuit is to be powered-OFF (signal EXT is asserted).

The interface between the ICU 124 and the island 104 for example comprises lines for providing one or more of the following control signals:
  one or snore clock signals CLK, for example comprising the main clock signal of the island provided by the clock generator 132, and in some embodiments a clock signal for the island controller TRC;
  the signal EXT mentioned above for controlling the island to power-ON or power-OFF. In some embodiments, an acknowledgement signal can be provided from the island controller TRC to the ICU indicating when the main power supply of the island via switch 708 is ready to use;
  the signal RET mentioned above controlling at least part of the island to enter a low power retention state. In some embodiments, an acknowledgement signal can be provided torn the island controller TRC to the ICU indicating when the retention power supply of the island via switch 710 is ready to use;
  one or more power state signals (PWR) for controlling transitions between power states of the island. For example, these signals comprise signals for controlling the current limit and the time delay of power-ON and power-OFF sequences of the island, and retain signals for controlling retention components to retain data prior to power-OFF or restore data following power-ON;

a POK signal from the island to the ICU confirming that a change in the power state of the island has been completed;

one or more reset signals RST. For example, the reset signals may comprise a signal for resetting the island controller TRC, a signal for resetting one or more registers in the island that remain switched on during the retention mode, and a signal for resetting one or more registers in the island that are switched-off during the retention mode; and one or more isolation signals ISO for isolating one or more inputs or outputs if the island is in preparation for entering a power-OFF or retention mode.

Figure 8:
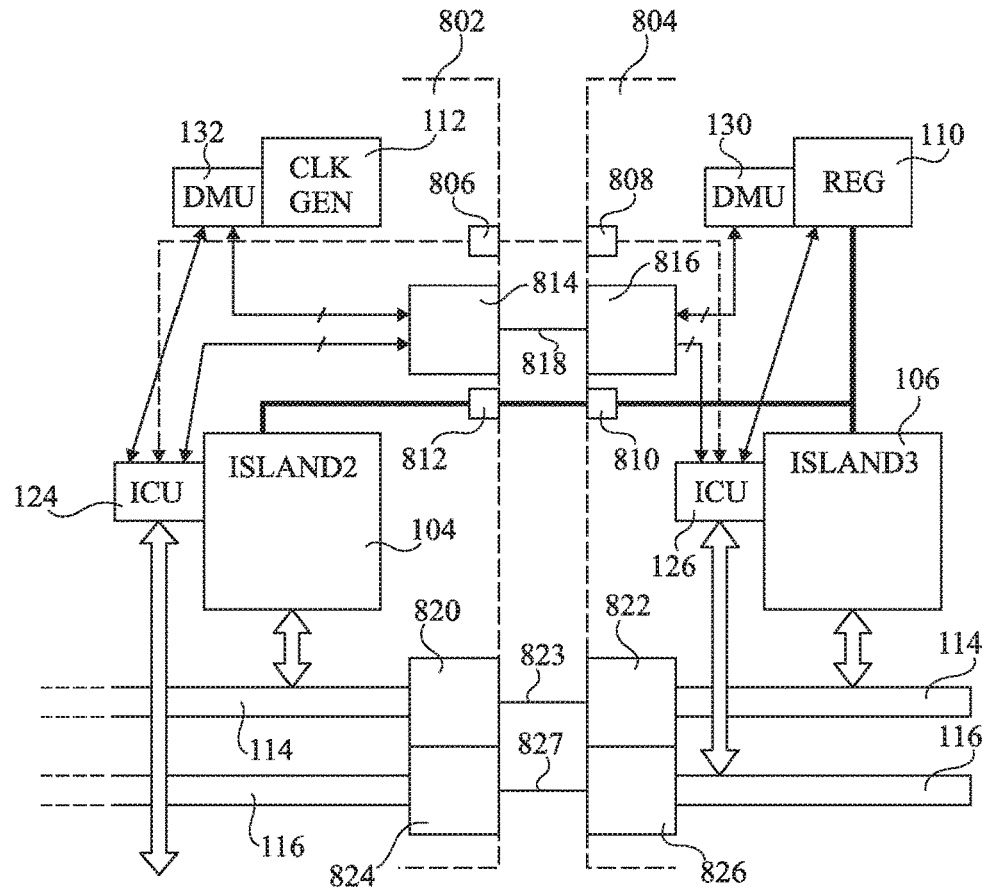
FIG. 8 schematically illustrates part of the computing system of FIG. 1 in the case that it is implemented across two integrated circuits.

FIG. 8 schematically illustrates the islands 104, 106 and resources 110, 112 of FIG. 1 in the case that the island 104 and clock generator 112 are formed on one integrated circuit (IC) 802, and the island 106 and voltage regulator 110 are formed on another integrated circuit (IC) 804. As illustrated, the clock line carrying the clock signal generated by the clock generator 112 for example passes from the IC 802 to the IC 804 via connection pads or pins 806 and 808 of the circuits 802 and 804 respectively. Similarly, the supply voltage line from the voltage regulator 110 for example passes from the IC 804 to the IC 802 via connection pads or pins 810 and 812 of the circuits 804 and 802 respectively. The communications interfaces between the ICUs and DMUs between the ICs 802, 804 are for example transferred via a serial interface between the ICs 802, 804. For example, the ICU 124 and DMU 132 of the IC 802 are both coupled by parallel interfaces with a two-way parallel/serial converter 814 of the IC 802, and the ICU 126 and DMU 130 of the IC 804 are both coupled by parallel interfaces with a two-way parallel/serial converter 816 of the IC 802. One or more serial interfaces 818 are provided between the converters 814, 816 of the ICs 802, 804.

The data bus 114 for example passes from the IC 802 to the IC 804 via two-way parallel/serial converters 820 and 822 of ICs 802 and 804 respectively and a serial connection 823 there between. Similarly, the island control bus 116 for example passes from the IC 802 to the IC 804 via two-way parallel/serial converters 824 and 826 of ICs 802 and 804 respectively and a serial connection 827 there between.

An advantage of the embodiments described herein is that, by decentralizing the control of resources (voltage supply circuits and/or clock generators) to circuits associated with each island, and providing mediation by a circuit associated with each resource, the complexity of change of mode operations can be significantly reduced. This for example permits DVFS (dual voltage and frequency stepping) to be implemented to switch islands from a high powder mode, in which they for example compute at full speed, to a lower power mode, in which they for example compute at a lower speed. This allows power consumption of the whole system to be adjusted dynamically at any time based on the actual requirements in terms of computing activity.

Having thus described at least one illustrative embodiment, various alterations, modifications and improvements will readily occur to those skilled in the art. For example, it will be apparent to those skilled in the art that the particular distribution of components of the computing system 100 between separate integrated circuits as shown in FIG. 8 is merely one example, and that many different configuration would be possible. For example, in some embodiments, all of the resources, and their corresponding DMU's, could be positioned on a separate integrated circuit to the islands 102, 104 and 106.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates an embodiment of the invention, in one form, and such exemplifications are not to be construed as limiting the scope of the invention in any manner.

The invention claimed is:

1. A computing system comprising:
   a plurality of islands, each island comprising a group of circuits capable of operating in one of a plurality of operating modes, wherein in a first of the operating modes the circuits of the island are adapted to receive a first voltage and/or a first clock signal of a first frequency, and in a second of the operating modes the circuits of the island are adapted to receive a second voltage different from the first voltage and/or a second clock signal of a second frequency different from the first frequency, a first of the islands being coupled to a first island control circuit and a second of the islands being coupled to a second island control circuit, the first and second islands receiving a same voltage and/or a same clock signal, and being coupled via an island control bus to one or more operating mode control circuits;
   a first mediation circuit coupled to the first and second island control circuits and adapted:
      to receive a first request from the first island control circuit to change a current operating mode of the first island;
      to receive a second request from the second island control circuit to change a current operating mode of the second island; and
   to control a first voltage supply circuit and/or a first clock generator to change the voltage and/or the clock signal supplied to the first and second islands based on the first and second requests, wherein the first and second island control circuits are adapted to generate the first and second requests respectively based on a change of mode request transmitted by the one or more operating mode control circuits.

2. The computing system of claim 1, comprising a further bus coupled to each of the first and second islands and providing a data link between the islands, wherein the island control bus is dedicated to operating mode control communications.

3. The computing system of claim 1, further comprising a second mediation circuit coupled to the first mediation circuit and to a second resource adapted to supply: a first voltage level to the first voltage supply circuit or the first clock generator; or a first clock signal to the first clock generator, wherein the second mediation circuit is adapted to receive a request from the first mediation circuit to modify the operating mode of the second resource.

4. The computing system of claim 1, wherein the first mediation circuit is adapted to control the first voltage supply circuit and/or the first clock generator to change a voltage level and/or clock signal supplied to the first and second islands to values compatible with the first and second requests.

5. The computing system of claim 1, wherein the first island is formed on a first integrated circuit, and at least one of: the second island; the voltage supply circuit; and the clock generator are formed on a second integrated circuit.

6. The computing system of claim 1, further comprising a domain link controller circuit coupled:
to the first and second island control circuits via the island control bus; and
to the one or more operating mode control circuits for controlling the operating modes of the first and second islands via the first and second island control circuits.

7. The computing system of claim 6, wherein the one or more operating mode control circuits comprise:
a first operating mode control circuit executing a mode switching program; and
a second operating mode control circuit coupled to the domain link controller circuit and adapted to control the operating modes of the first and second islands while the first operating mode control circuit is unavailable.

8. The computing system of claim 1, wherein:
the first island control circuit is coupled to the first island via a plurality of control lines providing one or more control signals for controlling a change in operating mode of the first island; and
the second island control circuit is coupled to the second island via a plurality of control lines providing one or more control signals for controlling a change in operating mode of the second island.

9. A method comprising:
receiving, by a first mediation circuit coupled to first and second island control circuits, a first request from the first island control circuit to change a current operating mode of a first island, the first request being generated based on a change of mode request transmitted by one or more operating mode control circuits;
receiving, by the first mediation circuit coupled to the first and second island control circuits, a second request from the second island control circuit to change a current operating mode of a second island, the second request being generated based on the change of mode request transmitted by the one or more operating mode control circuits, wherein the first island control circuit is coupled to a first island, the second island control circuit is coupled to a second island, the first and second islands receiving a same voltage and/or a same clock signal, and being coupled via an island control bus to the one or more operating mode control circuits, and each of the first and second islands comprises a group of circuits capable of operating in one of a plurality of operating modes, wherein in a first of the operating modes circuits of the island receive a first voltage and/or a first clock signal of a first frequency, and, in a second of the operating modes, circuits of the island receive a second voltage different to the first voltage and/or a second clock signal of a second frequency different to the first frequency; and
controlling, by the first mediation circuit, a first voltage supply circuit and/or a first clock generator to supply the first or second voltage and/or the first or second clock signal to the first and second islands based on the first and second requests.

10. A computing system comprising:
a plurality of islands, each island comprising a group of circuits capable of operating in one of a plurality of operating modes, wherein in a first of the operating modes the circuits of the island are adapted to receive a first voltage and/or a first clock signal of a first frequency, and in a second of the operating modes the circuits of the island are adapted to receive a second voltage different from the first voltage and/or a second clock signal of a second frequency different from the first frequency, a first of the islands being coupled to a first island control circuit and a second of the islands being coupled to a second island control circuit, the first and second islands receiving a same voltage and/or a same clock signal;
a first mediation circuit coupled to the first and second island control circuits and adapted:
to receive a first request from the first island control circuit to change a current operating mode of the first island;
to receive a second request from the second island control circuit to change a current operating mode of the second island; and
to control a first voltage supply circuit and/or a first clock generator to change the voltage and/or the clock signal supplied to the first and second islands based on the first and second requests; and
a second mediation circuit coupled to the first mediation circuit and to a second resource adapted to supply: a first voltage level to the first voltage supply circuit or the first clock generator; or a first clock signal to the first clock generator, wherein the second mediation circuit is adapted to receive a request from the first mediation circuit to modify the operating mode of the second resource.

11. A computing system comprising:
a plurality of islands, each island comprising a group of circuits capable of operating in one of a plurality of operating modes, wherein in a first of the operating modes the circuits of the island are adapted to receive a first voltage and/or a first clock signal of a first frequency, and in a second of the operating modes the circuits of the island are adapted to receive a second voltage different from the first voltage and/or a second clock signal of a second frequency different from the first frequency, a first of the islands being coupled to a first island control circuit and a second of the islands being coupled to a second island control circuit, the first and second islands receiving a same voltage and/or a same clock signal;
a first mediation circuit coupled to the first and second island control circuits and adapted:
to receive a first request from the first island control circuit to change a current operating mode of the first island;
to receive a second request from the second island control circuit to change a current operating mode of the second island; and
to control a first voltage supply circuit and/or a first clock generator to change the voltage and/or the clock signal supplied to the first and second islands based on the first and second requests; and
a domain link controller (DLC) circuit coupled:
to the first and second island control circuits via an island control bus; and
to one or more operating mode control circuits for controlling the operating modes of the first and second islands via the first and second island control circuits.

12. The computing system of claim 11, wherein the one or more operating mode control circuits comprise:
a first operating mode control circuit executing a mode switching program; and
a second operating mode control circuit coupled to the domain link controller circuit and adapted to control the operating modes of the first and second islands while the first operating mode control circuit is unavailable.

* * * * *